May 25, 1937.    J. W. LOGAN, JR    2,081,459
MAGNETIC SHOE BRAKE
Filed July 12, 1934
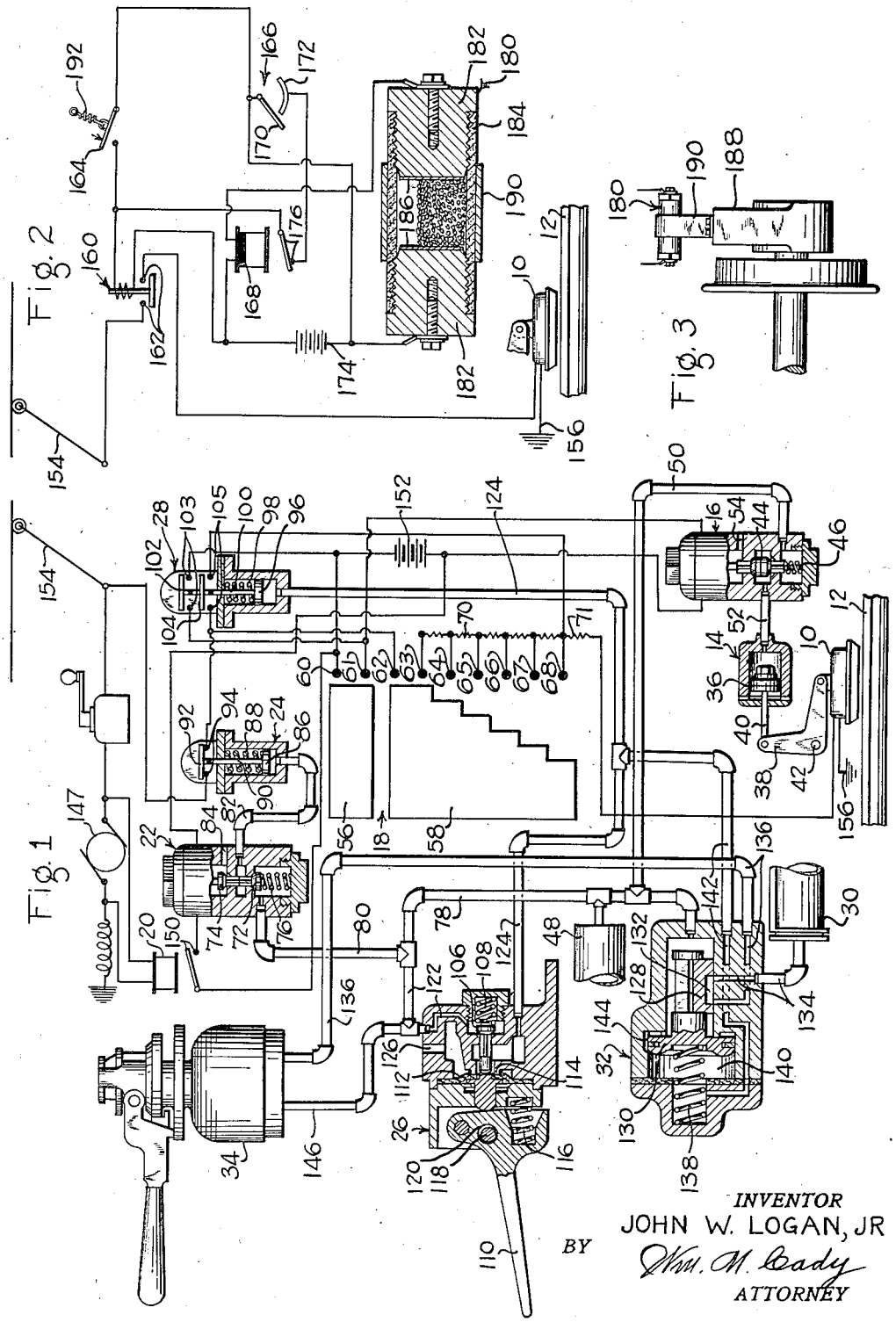
INVENTOR
JOHN W. LOGAN, JR
BY
Wm. M. Cady
ATTORNEY Patented May 25, 1937

2,081,459

UNITED STATES PATENT OFFICE 2,081,459

MAGNETIC SHOE BRAKE

John W. Logan, Jr., Edgewood, Pa., assignor to The Westinghouse Air Brake Company, Wilmerding, Pa., a corporation of Pennsylvania Application July 12, 1934, Serial No. 734,781

24 Claims. (Cl. 303—3)

This invention relates to magnetic shoe brakes for railway trains and traction vehicles, and more particularly to means for controlling the operation of such a brake when employed in conjunction with a fluid pressure brake.

When bringing a train or vehicle traveling at high speeds to a stop in a relatively short distance, high retarding forces must be applied. If the brakes on the train or vehicle are of the type which operate alone on the vehicle wheels, then the retarding force which may be applied is limited to that corresponding to the maximum adhesion between the vehicle wheels and track rails. If too great a retarding force is applied, then the wheels may slide, which is very objectionable due to the uneven wear caused on the wheels.

Where a greater retarding force must be applied than can be permitted by the adhesion between the wheels and rails, it is a practice to employ a supplementary brake which does not depend upon this adhesion. One form of supplementary brake commonly employed is the magnetic track shoe brake. As is well known in the art, this type of brake employs magnetic track shoes which, by engagement with the track rails, produce a braking effect in addition to that produced on the vehicle wheels. The track shoes are normally maintained out of engagement with the track rails, but when the brakes are applied the track shoes are brought into engagement with the rails and energized, at the same time the brakes operating on the wheels are applied, so that there is a combined retarding force applied to the train or vehicle due to both the track brake and wheel brake. The degree of application of the wheel brakes, which are most generally of the fluid pressure type, may be controlled in the manner now commonly employed for such brakes, while the degree of application of the track shoe brakes may be controlled by controlling the degree of energization of windings on the track shoes.

When a vehicle or train employing magnetic shoe brakes is brought to a stop, it is highly desirable that the energization of the track shoes be terminated while the vehicle or train is at rest, because the energy consumed by the windings of the track shoes while the train or vehicle is at rest may amount to a considerable portion of, or even more than, that consumed by the track shoes during their operation when making a stop. In addition, during a stop period the track shoes, while energized, are subjected to undue heating which may in many cases greatly shorten the useful life of the track shoes. The train or vehicle can of course be held at rest by the wheel brakes, if need be, without this loss of power or heating. It is therefore an object of my invention to provide a magnetic shoe brake apparatus in which the magnetic track shoes are automatically deenergized when the vehicle or train is brought to a stop, regardless of operation of the brake controlling means by the operator.

Another object of my invention is to provide a braking equipment having provision for producing a braking effect on the vehicle wheels and for producing a braking effect on the track rails, in which the degree of each braking effect may be controlled independent of the other.

While it is advantageous to have independent control means for each of the track and wheel brakes, it is highly desirable that means be provided for applying both brakes simultaneously to a maximum degree in response to operation of a single control element when initiating an emergency application of the brakes. It is therefore another object of my invention to provide a braking equipment in which both the track and wheel brakes, while independently controllable, are applied simultaneously to a maximum degree in response to movement of a control element, which element is also employed to provide the well known dead man safety feature in the equipment.

Other objects and advantages of my invention will be apparent from the following description of one embodiment thereof, which has been illustrated in the attached drawing, wherein, Figure 1 is a schematic and partially diagrammatic view of the embodiment.

Figure 2 is a modification of the embodiment illustrated in Figure 1, showing an arrangement of other apparatus for deenergizing the magnetic track shoes when the train or vehicle is brought to rest.

Figure 3 is a partial detailed view showing how a control device forming part of the apparatus shown in Figure 2 may be attached to a part of the vehicle.

In the embodiment illustrated in Figure 1, I have shown a single magnetic track shoe device 10, which is adapted to be lowered into engagement with a track rail 12, and a raising cylinder 14 and magnet valve device 16, for controlling the raising and lowering of the track shoe device 10, but it will be apparent that any other number or combination of these devices may be employed. For controlling the degree of energization of the track shoe device during service applications of the magnetic brakes, there is provided a drum type controller 18.

For effecting deenergization of the track shoe device 10 when the vehicle or train is at rest, there are provided a relay 20, a magnet valve device 22, and a pneumatic switch device 24.

For effecting a maximum degree of energization and engagement of the track shoe device with the track rail during emergency applications of the magnetic brakes, there are provided a foot valve device 26 and a pneumatic switch device 28.

Fluid pressure brake apparatus associated with the magnetic shoe brake apparatus comprises a brake cylinder 30, an emergency valve device 32, and a straight air brake valve device 34.

The track shoe device 10 may be of one of a large number of types, and I do not therefore wish to be limited to any specific type. The track shoe device is normally held in a raised position by the supply of fluid under pressure to the raising cylinder 14. The raising cylinder 14 comprises a casing defining a piston chamber in which is disposed a piston 36, which is operatively connected to a bell crank lever 38 by a piston rod 40. The bell crank lever 38 is pivotally mounted on some portion of the vehicle framework, as at 42, and has the other end thereof pivotally connected to the track shoe device 10.

The supply of fluid under pressure to the raising cylinder 14 is controlled by the magnet valve device 16. This device is provided with a double beat valve 44, which is urged toward an upper seated position by a spring 46 and to a lower seated position by action of an electromagnet in the upper part of the valve device casing, which when energized actuates the double beat valve downwardly.

When the double beat valve is in upper seated position, fluid under pressure is supplied from a suitable source, such for example as a reservoir 48, to the raising cylinder 14, by way of pipe 50, past the open lower seat of the magnet valve device, and pipe 52. When the double beat valve is in lower seated position, the supply of fluid to the raising cylinder 14 is cut off, and pressure in the raising cylinder is released to the atmosphere past the open upper seat in the magnet valve device and through port 54.

The drum controller 18 may be constructed in any suitable manner, according to types of controllers commonly employed in railway braking equipment, and I have therefore only diagrammatically indicated two segmental members 56 and 58, which may be secured to and insulated from a suitable supporting drum. The segment 56 is adapted to simultaneously engage stationary contact fingers 60 and 61, while the segment 58 is adapted to simultaneously engage stationary contact fingers 62 and 63, and successively thereafter similar contact fingers 64 to 68 inclusive. Fingers 63 to 68 inclusive are connected to sections of a resistance 70, so that as these fingers are sequentially engaged by the segment 58, sections of the resistance 70 are cut out of circuit, as will hereinafter more fully appear.

The magnet valve device 22 is provided with a supply valve 72 and a release valve 74. The supply valve 72 is urged toward seated position and the release valve 74 toward unseated position by a spring 76. The release valve 74 is urged toward seated position and the supply valve 72 toward unseated position by action of an electromagnet in the upper part of the valve device casing, which when energized actuates the valves downwardly to the stated positions.

When the supply valve 72 is unseated and the release valve 74 seated, fluid under pressure is supplied from the reservoir 48 to the pneumatic switch device 24, by way of pipes 78 and 80, past the unseated supply valve 72, and pipe 82. When the supply valve 72 is seated and the release valve 74 unseated, this supply of fluid to the switch device 24 is cut off and fluid pressure in the switch device is released to the atmosphere, by way of pipe 82, past the unseated release valve 74, and port 84.

When fluid under pressure is supplied to the switch device 24, it actuates a piston 86 therein upwardly against opposition of a spring 88. The piston 86 has secured thereto a stem 90. Secured to and insulated from the stem 90 is a contact 92 which is adapted to bridge stationary contacts 94. When the piston 86 is in its uppermost position, contact 92 is disengaged from stationary contacts 94 and when piston 86 is in its lowermost position contact 92 is in engagement with contacts 94.

The pneumatic switch device 28 is similar to the switch device 24, being also provided with a piston 96 which is actuated upwardly by fluid pressure acting therebelow, against opposition of a spring 98. Secured to the piston 96 is a stem 100. Secured to and insulated from the stem and from each other are contacts 102 and 104, the former being adapted to engage stationary contacts 103 and the latter being adapted to engage stationary contacts 105.

When the piston 96 is in uppermost position, contacts 102 and 104 are, respectively, out of engagement with contacts 103 and 105; and when the piston 96 is in lowermost position, the movable contacts are in engagement with the stationary contacts.

Fluid under pressure to actuate the piston 96 is controlled by the foot valve device 26. This valve device is provided with a valve 106 which is urged toward seated position by a spring 108 and toward unseated position by downward operation of a foot pedal 110. The foot valve device is also provided with a diaphragm 112 which is adapted to be actuated into engagement with a valve seat 114 when the foot pedal 110 is actuated downwardly, at the same time the valve 106 is actuated to unseated position. Foot pedal 110 is normally urged to an upper position by a spring 116, the movement of the foot pedal upwardly and downwardly being limited by a pin 118 projecting in an oversize aperture 120.

When the diaphragm 112 is held in engagement with the seat 114, and the valve 106 is in unseated position, fluid under pressure is supplied from the reservoir 48 to the pneumatic switch device 28, by way of pipe 78, pipe and passage 122, past the unseated valve 106, and pipe 124. When the valve 106 is in seated position, and the diaphragm 112 is out of engagement with the valve seat 114, fluid pressure below the piston 96 in the switch device 28 is released to the atmosphere, by way of pipe 124, past the open seat 114, and port 126.

The emergency valve device 32 may be one of a large number of types commonly employed in the art, and as one example I have shown a commonly used type comprising a single slide valve 128 actuated by a piston 130. When the piston 130 and slide valve 128 are in release position, as shown in Figure 1, cavity 132 in the slide valve connects pipe and passage 134 leading to the brake cylinder 30 with pipe and passage 136 leading to the brake valve device 34. When piston 130, and slide valve 128, are actuated to the left to application position, against opposition of spring 138, the slide valve 128 blanks the passage 136, and uncovers the passage 134 leading to the brake cylinder. The brake cylinder is then connected directly to the reservoir 48.

Piston chamber 140, to the left of piston 130, is connected to the foot valve device 26, by way of pipe and passage 142, and pipe 124. When the piston 130 is in release position, the pressure on either side of the piston is equalized through the feed groove 144. When the pressure to the left of piston 130 is suddenly reduced, as by unseating of the diaphragm 112 from the seat 114 in the foot valve device 26, the piston 130 is moved to the extreme left hand position.

The straight air brake valve device 34 may be of any suitable type, such for example as the rotary type having the usual application, lap and release positions. When the emergency valve device 32 is in release position, fluid under pressure may be supplied to the brake cylinder 30 by movement of the handle of the brake valve device 34 to application position, whereupon fluid will flow from the reservoir 48 to the brake cylinder, by way of pipe 146, the brake valve device, pipe and passage 136, cavity 132, and pipe and passage 134. When the emergency valve device is actuated to application position, that is, when the piston 130 moves to the extreme left hand position, the slide valve 128 cuts off this communication.

In operation, when the vehicle or train is running the handle of the brake valve device 34 and the drum controller 18 are maintained in release position, and pressure is maintained on the foot pedal 110 by the operator. With the controller 18 in release position, the magnet valve device 16 is maintained deenergized, so that fluid under pressure is supplied to the raising cylinder 14, and the track shoe device 10 is therefore held in a raised position. The track shoe device is also deenergized at this time, because, as will appear more fully later, the circuit to the source of power supply is incompleted.

With pressure maintained on the foot pedal 110, fluid under pressure is supplied to the pneumatic switch device 28, and to the piston chamber 140 in the emergency valve device 32, so that the switch device 28 maintains the contacts operated thereby open and the emergency valve device 32 is held in release position.

Also, while the train or vehicle is running the magnet valve device 22 is maintained deenergized, so that the supply of fluid under pressure to the switch device 24 is cut off and the switch device is vented to the atmosphere.

The magnet valve device 22 is maintained deenergized by maintaining the relay 20 energized. This relay is intended to be energized only while the vehicle or train is in motion. One method of accomplishing this comprises connecting the relay across the armature 147 of one of the vehicle driving motors, such for example as shown in Figure 1. The relay is then designed to hold its contacts 150 open so long as the vehicle motor is running, whether the electromotive force across the motor armature be due to the current supplied thereto or due to an electromotive force generated while the vehicle or train is drifting.

When it is desired to effect a service application of the brakes, the drum controller 18 is operated through a degree of rotational movement to energize the track shoe device 10 in accordance with the degree of braking desired by operation of the magnetic shoe brakes. At the same time, the handle of the brake valve device 34 is moved to and held in application position for a time sufficient to supply fluid under pressure to the brake cylinder 30 to apply the fluid pressure brakes in accordance with the degree of braking desired on the wheels. Both the track shoe and fluid pressure brakes are thus applied, each being controlled independent of the other and according to the desired degree of each.

Of course if a light application is desired, either the magnetic shoe brakes or the fluid pressure brakes may be applied alone, but in the braking of high speed trains and vehicles it is the usual practice to apply both brakes simultaneously.

When the controller 18 is operated to application position, the segment 56 engages and connects together fingers 60 and 61, whereupon the electromagnet of the magnet valve device 16 is energized from a suitable source of current supply, such for example as a battery 152. Energization of this magnet valve device causes its double beat valve 44 to be actuated to lower seated position, whereupon fluid under pressure in the raising cylinder 14 is released to the atmosphere, and the track shoe device 10 drops to engagement with the track rail 12.

At the same time segment 56 engages fingers 60 and 61, segment 58 engages fingers 62 and 63. Engagement with these latter two fingers connects the winding in the track shoe device 10 to the source of power supply, which in this case is through a trolley 154 and ground connection 156, which may be a third rail or the track rail 12, the circuit to the track shoe device including the contacts of the switch device 24. When the drum controller is rotated further, segment 58 sequentially engages fingers 64 to 68, to cut out sections of the resistance 70, so as to energize the track shoe device varying degrees. A small portion 71 of the resistance 70 remains in circuit after segment 58 has finally contacted finger 68, so as to limit the current supplied, as well as serving to increase the rate of energization. With current thus supplied to the track shoe device, a braking effect is produced in accordance with the degree of energization thereof.

As the train or vehicle slows down, the degree of application of each brake may be varied according to the conditions to be maintained. When the train or vehicle is brought to a stop, the electromotive force across the relay 20 will diminish to zero, and hence the relay 20 will be deenergized. The relay is designed to close its contacts 150 at or slightly before the train or vehicle stops. Closing of contacts 150 energizes the electromagnet in the magnet valve device 22, from the battery 152. The magnet valve device will then unseat its supply valve 72 and seat its release valve 74. Fluid under pressure will then be supplied to the switch device 24, and this device will cause movable contact 92 to be disengaged from stationary contacts 94. When this takes place the circuit to the magnetic track shoe device 10 will be interrupted, and the device will therefore be deenergized.

Since the relay 20 will be deenergized at or about the time the vehicle or train is brought to a stop, the fluid pressure brake may be employed to bring the train or vehicle to a stop and to hold it at rest. Deenergization of the track shoe device therefore effects a great saving in electric power, as well as avoiding unnecessary heating of the track shoe device.

While the track shoe device can of course be deenergized by operating the controller 18 to release position, the operator will usually be engaged in manipulating the handle of the brake valve device 34 at the end of a stop, and may forget to move the controller to release position. The means described will always automatically deenergize the track shoe device and thus relieves the operator of this responsibility.

When it is desired to effect an emergency application of the brakes the operator need only release pressure from the foot pedal 110 of the foot valve device 26. When this is done, diaphragm 112 moves out of engagement with seat 114 and valve 106 is seated, both being accomplished by spring 108. Fluid pressure beneath piston 96 in pneumatic switch device 28, and fluid pressure in piston chamber 140 to the left of piston 130, in the emergency valve device 32, is released to the atmosphere, through the paths as before described. The pneumatic switch device 28 thus causes its movable contacts 102 and 104 to, respectively, engage stationary contacts 103 and 104, while at the same time the emergency device piston 130 moves to its extreme left hand position.

Engagement of movable contact 102 with stationary contacts 103 energizes the magnet valve device 16, to effect lowering of the track shoe device 10. Engagement of movable contacts 104 with stationary contacts 105 connects the winding of the track shoe device direct to the source of power supply, with only the small portion 71 of the resistance 70 remaining in circuit, as shown by the connections in Figure 1.

Movement of the piston 130 to the left connects the brake cylinder 30 directly to the reservoir 48, so that the fluid pressure brakes are applied simultaneously with the magnetic shoe brakes. It will thus be obvious that the maximum degree of braking effect is produced when an emergency application is effected, without the necessity of operating the drum controller 18, although an emergency application may be effected by operating both the controller 18 and the brake valve device 34.

A release of the brakes following an emergency application is effected by again applying pressure to the foot pedal 110. This will cause fluid under pressure to again be supplied to the pneumatic switch device 28 and to the left of the piston 130. The pneumatic switch device 28 will then be operated to deenergize and cause raising of the track shoe device 10, while the emergency valve device will be actuated to release position to vent the brake cylinder 30 to the atmosphere.

The release of pressure on the foot pedal 110 may be by design, as when effecting an emergency application of the brakes, or it may be by accident, as when the operator becomes incapacitated. The foot valve device 26 therefore serves as a safety device, as well as serving as a means for initiating an emergency application of the brakes.

If when effecting either a service or an emergency application of the brakes, the magnetic shoe brake apparatus should fail to function, as when the power supply is interrupted, the fluid pressure brakes may be applied to the maximum degree by manipulation of the handle of the brake valve device in the usual manner, or by releasing pressure on the foot pedal 110. If the fluid pressure brake should be rendered inoperative, as by a loss of fluid pressure in reservoir 48 and pipe 124, and the magnetic shoe brake is operative, the latter will be applied to a maximum degree by operation of the switch device 28, as described.

In the modification illustrated in Figure 2, I have shown in schematic form a more highly sensitive apparatus for deenergizing the track shoe device when the train or vehicle comes to rest. This apparatus is shown as comprising a circuit breaker device 160 having contacts 162 in the circuit from the power supply to the track shoe device. Energization of the circuit breaker device 160 to effect closing of contacts 162, is controlled either by a push button device 164 or by a controller device 166 having associated therewith a slow pick-up relay 168. Operation of the relay 168 is controlled by a current regulating device 180.

The controller device 166 is adapted to control normal applications of the magnetic shoe brakes, and essentially comprises a movable contact 170 adapted to engage a stationary contact 172. When the movable contact 170 engages the stationary contact 172, current is supplied from a battery 174 to the winding of the circuit breaker device 160, through contacts 176 of the slow pick-up relay 168. The slow pick-up relay is connected to the battery 174 in series with the current regulating device 180. This device may comprise a pair of electrically conducting members 182, of brass, copper, or the like, held in spaced relation by an insulating tube member 184, of bakelite, fiber, or the like, and having adjacent faces 186 of some highly conducting material, as silver or the like. In the space between the two faces 186, and confined by the insulating member 184, are disposed granules of electrically conducting material, as carbon or the like.

The current regulating device 180 is preferably secured to some part of the vehicle or train which received appreciable vibration during movement, as for example the truck frame 188 shown in Figure 3, by a bracket 190. The characteristic of importance in connection with the current regulating device is that when the device is subjected to vibration the granulated material separates, so that the resistance of the conducting path afforded by the particles thereof, between the faces 186, is relatively high, and when the device is at rest, the particles settle, so that the resistance of this path is relatively low. For example, it has been found that the resistance during vibration may rise to ten times the value of the resistance at rest.

Therefore, when the contact 170 of the controller device 166 is moved into engagement with the contact 172, the circuit breaker 160 is operated to close contacts 162, whereupon the track shoe device 10 is energized. As long as the train or vehicle is in motion, sufficient vibration will be set up in the current regulating device 180 to cause a high resistance to be established in the circuit to the relay 168. The relay will then be insufficiently energized to open its contacts 176.

When the train or vehicle is brought to a stop, the vibration ceases and the value of this resistance decreases very greatly, so that the current supplied to the slow pick-up relay 168 will be sufficient to cause it to open contacts 176 after the elapse of a definite interval of time. Opening of contacts 176 deenergizes the circuit breaker 160, which in turn opens its contacts 162 to deenergize the track shoe device 10.

In case it is desired to maintain the track shoe device 10 energized, this may be accomplished by operating the push button 164, which, although normally held open by spring 192, may be manually held closed for such time as desired.

While the modification illustrated in Figure 2 has been shown in somewhat diagrammatic and elementary form, it will be apparent that it may be embodied in a more complete brake apparatus such as that depicted in Figure 1. In addition, it will be apparent to those skilled in the art that many modifications and changes may be made in the embodiments shown, and I do not therefore wish to be limited to these specific embodiments or other than by the spirit and scope of the appended claims.

Having now described my invention, what I claim as new and desire to secure by Letters Patent, is:

1. In a vehicle brake system, the combination with an electric brake device and a brake cylinder, of means for rendering said electric brake device effective to produce a braking effect, means for supplying fluid under pressure to said brake cylinder to also produce a braking effect, means for rendering said electric brake device ineffective to produce a braking effect, and means responsive to motion of the vehicle for preventing operation of said last means while the vehicle is moving.

2. In a vehicle brake system, the combination with a magnetic track shoe device adapted to have different degrees of current supplied thereto to produce different degrees of braking effect, of means for controlling the degree of current supplied to said track shoe device for effecting service applications of the brakes, means operable in effecting an emergency application of the brakes for rendering said track shoe device effective to produce a maximum braking effect independent of operation of said control means, and means controlled by the speed of the vehicle and rendered effective when the vehicle is brought to a stop for automatically deenergizing said track shoe device.

3. In a vehicle brake system, the combination with an electric brake device, of means for controlling the degree of braking effect produced by said brake device, means operable to render said brake device ineffective to produce a braking effect, and means responsive to vibrations of the vehicle while in motion for controlling said last named means.

4. In a vehicle brake system, the combination with an electric brake device adapted to have current supplied thereto to produce a braking effect, means for controlling the degree of current supplied to said brake device, switch means operable to interrupt the supply of current to said brake device, an electroresponsive device for controlling operation of said switch means, and means for controlling energization of said electroresponsive device and effective during motion of the vehicle for maintaining said electroresponsive device deenergized and effective when said vehicle comes to rest for energizing said electroresponsive device.

5. In a vehicle brake system, the combination with a magnetic track shoe device adapted to have current supplied thereto to produce a braking effect, of switch means controlling current supplied to said track shoe device, electroresponsive means controlling said switch means, and means for controlling operation of said electroresponsive means and operable during vibration thereof to prevent operation of said electroresponsive device and operable when said vibration ceases to cause operation of said electroresponsive device to effect operation of said switch means.

6. In a vehicle brake system, the combination with a magnetic track shoe device adapted to have current supplied thereto to produce a braking effect, of switch means controlling current supplied to said track shoe device, means including an electroresponsive device for controlling operation of said switch means, a current regulating device secured to the vehicle and adapted to control operation of said electroresponsive device according to vibration of said vehicle, said current regulating device diminishing the current supplied to said electroresponsive device when vibrated and increasing the current supplied to said electroresponsive device when at rest, and means for manually controlling at will operation of said switch means independently of said current regulating device.

7. In a vehicle brake system, the combination with a structural portion of the vehicle, of a control device associated with said structural portion and adapted to be vibrated according to vibration of said structural portion due to motion of the vehicle, braking means, means including an electroresponsive device for controlling said braking means, and means whereby said control device controls operation of said electroresponsive device.

8. In a vehicle brake system, the combination with a structural portion of the vehicle adapted to be vibrated due to motion of the vehicle, a control device associated with said structural portion and having fixed electrically conducting elements in spaced relation with movable electrically conducting elements disposed therebetween, an electroresponsive device, a source of current supply, and a circuit connecting said source, electroresponsive device and control device in series, said control device being operable to limit the current flowing in said circuit when said structural portion is vibrated and increasing said current when said structural portion is at rest.

9. In a vehicle brake system, the combination with a brake device and a vehicle driving motor, of control means for said brake device, means for preventing said brake device from producing a braking effect, and means responsive to rotation of said motor for controlling said last means and operable substantially all the while said motor is rotating to condition said last means to render said brake device effective to produce a braking effect.

10. In a vehicle brake system, the combination with an electric brake device, of a circuit through which current supplied to operate said device is adapted to flow, switch means for opening and closing said circuit, a control circuit for controlling operation of said switch means, means for opening and closing said control circuit at will, a relay having normally closed contacts in series with said control circuit, and means responsive to motion of the vehicle and operable when the vehicle stops for causing said relay to open its contacts to open said control circuit to deenergize said switch means.

11. In a vehicle brake system, the combination with an electric brake device, of a circuit through which current supplied to operate said device is adapted to flow, switch means for opening and closing said circuit, a control circuit for controlling operation of said switch means, means for opening and closing said control circuit at will, a relay having normally closed contacts in series with said control circuit, means responsive to motion of the vehicle and operable when the vehicle stops for causing said relay to open its contacts to open said control circuit to deenergize said switch means, and means operable at will for establishing another circuit to maintain said switch means energized.

12. In a vehicle brake system, the combination with a magnetic track shoe device and a brake cylinder, of a resistance, means for connecting said resistance and track shoe device to a source of power supply, and for thereafter cutting portions of said resistance out of circuit, a circuit adapted to connect said track shoe device to said source and to by-pass said last means, a switch device having contacts disposed in said circuit, means including an element normally subject to pressure from an operator for causing said switch means to hold said contacts open, and means responsive to movement of said element upon release of pressure by the operator for causing said switch means to close said contacts and for effecting a supply of fluid under pressure to said brake cylinder.

13. In a vehicle brake system, the combination with a magnetic track shoe device and a brake cylinder, of a resistance, means for connecting said resistance and track shoe device to a source of power supply, and for thereafter cutting portions of said resistance out of circuit, a circuit adapted to connect said track shoe device to said source and to by-pass said last means, a switch device having contacts disposed in said circuit, means including an element normally subject to pressure from an operator for causing said switch means to hold said contacts open, means responsive to movement of said element upon release of pressure by the operator for causing said switch means to close said contacts and for effecting a supply of fluid under pressure to said brake cylinder, and means rendered operable when the vehicle comes to rest for disconnecting said track shoe device from said source.

14. In a vehicle brake system, in combination, a brake device, control means for controlling operation of said brake device, means for preventing operation of said brake device by said control means, and means responsive to motion of the vehicle for rendering said last means effective and operable when the vehicle comes substantially to rest for rendering said last means ineffective to prevent operation of said brake device by said control means.

15. In a vehicle brake system, in combination, a brake device, control means for controlling operation of said brake device, means separate from said control means and operable to cut said brake device out of action, and means for preventing operation of said last means for substantially all the while the vehicle is vibrating due to motion thereof.

16. In a vehicle brake system, in combination, an electric brake device, a main circuit for supplying current to said brake device, control means for controlling the degree of current supplied through said circuit, a by-pass circuit around said control means, a switch device having a chamber and being operable to maintain said by-pass circuit open when fluid under pressure is supplied to said chamber, and safety control means for controlling the supply of fluid under pressure to said chamber.

17. In a vehicle brake system, in combination, brake means, a device having a chamber and operable when fluid under pressure is supplied to said chamber to render said brake means ineffective to produce a braking effect, a magnet valve device operable when energized to supply fluid under pressure to said chamber and operable when deenergized to cut off said supply and to release fluid under pressure from said chamber, and means responsive to movement of the vehicle for maintaining said magnet valve device deenergized while the vehicle is in motion and for energizing said magnet valve device when the vehicle comes substantially to a stop.

18. In a vehicle brake system, in combination, an electric brake device, a circuit for supplying current to said brake device, normally closed contacts in said circuit, pressure operated means for opening said contacts, electroresponsive valve means operable when energized to supply fluid under pressure to said pressure operated means, and means for maintaining said electroresponsive valve means deenergized while the vehicle is in motion and for effecting energization of said electroresponsive valve means when the vehicle comes substantially to a stop.

19. In a vehicle brake system, in combination, a magnetic track shoe device, a circuit adapted to be connected to a source of current supply for supplying current to said track shoe device, switch means for opening said circuit, means normally tending to effect operation of said switch means to open said circuit, and means responsive to motion of the vehicle for preventing opening of said circuit by said switch means until the vehicle is brought substantially to a stop.

20. In a vehicle brake system, in combination, a magnetic track shoe device, a circuit through which current is adapted to be supplied to said track shoe device, a resistance connected in said circuit, means for varying said resistance in controlling the degree of current supplied to said track shoe device, means for establishing a by-pass circuit around said resistance, and safety control means for controlling said by-pass means.

21. In a vehicle brake system, in combination, a magnetic track shoe device, a circuit for supplying current to said track shoe device, a switch for controlling said circuit, an electric motor driven according to the speed of the vehicle, electrically controlled means operated upon deenergization for effecting the opening of said switch, and means for energizing said electrically controlled means by the counter E. M. F. of said motor.

22. In a vehicle brake system, in combination, a magnetic track shoe device, a circuit for supplying current to said track shoe device, a switch for controlling said circuit, an electric motor driven according to the speed of the vehicle, means operative to effect opening and closing of said switch including a device operative upon deenergization for causing said means to effect opening of said switch, and means for energizing said last mentioned device by the counter E. M. F. of said motor.

23. In a vehicle brake system, in combination, a magnetic track shoe device, a circuit for supplying current to said track shoe device, a switch for controlling said circuit, a driving motor for said vehicle, electrically controlled means operated upon deenergization for effecting the opening of said switch, and means for energizing said electrically controlled means by the counter E. M. F. of said motor.

24. In a vehicle brake system, in combination, a magnetic track shoe device, a circuit for supplying current to said track shoe device, a switch for controlling said circuit, an electric motor driven according to the speed of the vehicle, means operative to effect opening and closing of said switch including a device operative upon deenergization for causing said means to effect opening of said switch, and means for energizing said last mentioned device by the current supplied to said motor and by the counter E. M. F. of said motor.

JOHN W. LOGAN, Jr.